(12) United States Patent
Roovers

(10) Patent No.: US 9,274,920 B2
(45) Date of Patent: Mar. 1, 2016

(54) CODE PROFILING IN EMBEDDED ULE APPLICATIONS

(71) Applicant: Dialog Semiconductor B.V., 's-Hertogenbosch (NL)

(72) Inventor: Wik Roovers, Prinsenbeek (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 100 days.

(21) Appl. No.: 13/629,933

(22) Filed: Sep. 28, 2012

(65) Prior Publication Data

US 2014/0096118 A1    Apr. 3, 2014

(51) Int. Cl.
- *G06F 9/44* (2006.01)
- *G06F 11/34* (2006.01)
- *G06F 1/32* (2006.01)

(52) U.S. Cl.
CPC .......... *G06F 11/3419* (2013.01); *G06F 1/3203* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 5,950,003 A * | 9/1999 | Kaneshiro et al. | 717/130 |
| 5,983,366 A * | 11/1999 | King | 714/38.13 |
| 6,332,117 B1 * | 12/2001 | Berry et al. | 702/187 |
| 6,718,286 B2 | 4/2004 | Rivin et al. | |
| 6,904,594 B1 * | 6/2005 | Berry et al. | 718/100 |
| 6,954,923 B1 * | 10/2005 | Yates, Jr. | G06F 9/30174 |
| | | | 717/128 |
| 6,983,455 B2 | 1/2006 | Kuzmin | |
| 7,013,456 B1 * | 3/2006 | Van Dyke | G06F 9/45533 |
| | | | 717/128 |
| 7,159,144 B2 | 1/2007 | Babu et al. | |
| 7,269,824 B2 * | 9/2007 | Noy | G06F 11/3409 |
| | | | 717/130 |
| 7,290,246 B2 * | 10/2007 | Cyran et al. | 717/130 |
| 7,305,663 B1 * | 12/2007 | McGuire | G06F 11/3495 |
| | | | 717/128 |
| 7,337,433 B2 * | 2/2008 | Cyran et al. | 717/130 |
| 7,386,686 B2 * | 6/2008 | Wu | G06F 8/443 |
| | | | 717/128 |
| 7,389,497 B1 * | 6/2008 | Edmark et al. | 717/130 |
| 7,519,959 B1 * | 4/2009 | Dmitriev | 717/128 |
| 7,802,724 B1 * | 9/2010 | Nohr | 235/384 |
| 7,827,539 B1 * | 11/2010 | Wygodny et al. | 717/128 |
| 7,849,449 B2 * | 12/2010 | Andrade | G05B 19/0426 |
| | | | 717/127 |
| 7,900,196 B2 * | 3/2011 | DeWitt, Jr. | G06F 11/3612 |
| | | | 717/130 |
| 8,136,124 B2 * | 3/2012 | Kosche | G06F 11/3447 |
| | | | 717/130 |
| 8,335,864 B2 * | 12/2012 | Cullimore | 709/250 |
| 8,359,292 B2 * | 1/2013 | Morrison et al. | 707/688 |
| 8,375,368 B2 * | 2/2013 | Tuck et al. | 717/130 |

(Continued)

OTHER PUBLICATIONS

Foley, "Getting Familiar with Bluetooth 4.0 Low Energy"; 2009 RTC, Group, Inc.; [retrieved on Mar. 15, 2014]; Retrieved from Internet <URL:http://www.rtcmagazine.com/articles/print-article/102266>;pp. 1-4.*

(Continued)

*Primary Examiner* — Xi D Chen

(74) *Attorney, Agent, or Firm* — Saile Ackerman LLC; Stephen B. Ackerman

(57) ABSTRACT

Mobile electronic devices and related methods to achieve an enhanced security level are disclosed. A security module is deeply embedded in a non-open companion chip of the mobile device, wherein the companion chip controls vital functions of the mobile device. Any security technology can be provided by the security module. The security module can, in case of a security violation, disable all vital functions of the companion chip without requiring communicating to other components of the mobile device. The vital functions deployed in the companion chip comprise e.g. system power management or audio functions.

34 Claims, 2 Drawing Sheets

(56) References Cited

U.S. PATENT DOCUMENTS

| | | | | |
|---|---|---|---|---|
| 8,468,502 | B2* | 6/2013 | Lui | G06F 11/3612 717/128 |
| 8,732,678 | B2* | 5/2014 | Nanja et al. | 717/136 |
| 8,762,951 | B1* | 6/2014 | Kosche | G06F 11/3476 717/127 |
| 8,799,904 | B2* | 8/2014 | Kuiper | G06F 9/4812 717/127 |
| 8,813,055 | B2* | 8/2014 | Kosche | G06F 11/3612 717/130 |
| 2005/0177327 | A1* | 8/2005 | Banginwar et al. | 702/60 |
| 2005/0246378 | A1* | 11/2005 | Hunt | 707/104.1 |
| 2007/0277157 | A1* | 11/2007 | DeWitt | G06F 11/3612 717/130 |
| 2008/0196017 | A1* | 8/2008 | Ritzau et al. | 717/154 |
| 2009/0276762 | A1* | 11/2009 | Ponitsch | G06F 11/3428 717/127 |
| 2010/0268523 | A1* | 10/2010 | Dhanwada et al. | 703/21 |
| 2012/0144374 | A1* | 6/2012 | Gallagher et al. | 717/128 |
| 2014/0053142 | A1* | 2/2014 | Fanning et al. | 717/141 |
| 2014/0282425 | A1* | 9/2014 | Zhao | G06F 11/3688 717/127 |

OTHER PUBLICATIONS

Lou, "What's the Difference Between Bluetooth Low Energy and ANt?"; 2012, Mobile content From Electronic Design; [retrieved on Mar. 15, 2014]; Retrieved from Internet <URL:electronicdesign.com/mobile/what-s-difference-between-bleutooth-low-energy-and-ant>;pp. 1-7.*

Patel, Rajawat, "A Survey of Embedded Software Profiling Methodologies"; 2011, International Jounal of Embedded Systems and Applications; [retrieved on Mar. 13, 2014]; Retrieved from Internet<URL:http://arxiv.org/ftp/arxiv/papers/1312/1312.2949.pdf>;pp. 19-40.*

Sigdel, et al., "A Profiling Framework for Design Space Exploration in Heterogeneous System Context"; Proc. of Prorisc Conference, Netherland, Nov. 2007; [retrieved on Mar. 13, 2014]; Retrieved from Internet <URL:http://citeseerx.ist.psu.edu/viewdoc/download?doi=10.1.1.65.8085&rep=rep1&type=pdf>;pp. 1-6.*

Raval, et al., "ow-Power TinyOS Tuned Processor Platform for Wireless Sensor Network Motes"; 2010 ACM; [retrieved on Nov. 16, 2015]; Retrieved from Internet <http://dl.acm.org/citation.cfm?id=1754405.1754408>; pp. 23-1-23-17.*

Min, Chandracasan, "A Framework for Energy-Scalable Communication in High-Density Wireless Networks"; 2002 ACM; [retrieved on Nov. 16, 2015]; Retrieved from Inernet <http://dl.acm.org/citation.cfm?id=566408.566419>; pp. 36-51.*

Park, et al., "ZigBee Based Dynamic Control Scheme for Multiple Legacy IR Controllable Digital Consumer Devices"; 2007 IEEE; [retrieved on Nov. 16, 2015]; Retrieved from Inernet <http://ieeexplore.ieee.org/stamp/stamp.jsp?tp=&arnumber=4146134>; pp. 1-2.*

Guan, et al., "A Runtime Profile Method for Dynamic Binary Translation Using Hardware-Support Technique"; 2009 IEEE; [retrieved on Nov. 16, 2015]; Retrieved from Inernet <http://ieeexplore.ieee.org/stamp/stamp.jsp?tp=&arnumber=5455266>; pp. 4683-4687.*

* cited by examiner

CODE PROFILING IN EMBEDDED ULE APPLICATIONS

BACKGROUND (1) Field of the Disclosure

This disclosure relates generally to the field of analysis of computer program code and relates in particular to code profiling on stand-alone devices.

(2) Description of the Background

For optimizing software in Microcontrollers it is necessary to debug this software by using Profiling. Code profiling is measuring relatively the number each function is called and its duration. So, if a function A is e.g. 30% of the time active it would be useful for the software engineer to optimize the code in this function. If function B is e.g. 0.05% of the time active, it may be not be necessary to optimize it.

This Code profiling could be performed for several processors, e.g. ARM (a reduced instruction set computer (RISC) instruction set architecture (ISA) developed by ARM Holdings) processors, by a Trace Unit or another debug unit. Debugger software running on a PC use this embedded Trace Unit to do the code profiling and the results are shown on the PC in e.g. graphical way.

But for most of the ultra-low energy (ULE) devices (e.g. DECT and Bluetooth Low Energy devices or other devices having a low duty cycle) such a Trace unit is not available. Such a Trace unit on chip requires too much chip area and is hence too expensive. Therefore code profiling cannot be performed for these devices so far.

Also if this trace unit would be available it would be impossible to do this Code Profiling for an ULE device (or other devices having a low duty cycle), because this device is going to sleep mode for e.g. 20 seconds and wakeups for only e.g. 20 Milliseconds. This wake up time is too short for a debugger to set up its conversation with this ULE device and so the debugger can't use the trace functionality for doing his Code profiling.

Code profiling by setting port pins would also not be always possible because the ULE devices have only a limited amount of output pins. So there would be no pins available to set to '1' and reset to '0' for doing any kind of code profiling.

Therefore code profiling cannot be performed for devices having a short wakeup mode and therefore the code cannot be optimized these days. This could result in too long time spent in wakeup mode. Finally this relative long wake up time results in a shorter standby time of the ULE device.

Therefore there is a need for code profiling tools, which can be applied to devices having a relatively short wakeup time compared to the sleep time (low duty cycle).

SUMMARY

A principal object of the present disclosure is to enable code profiling to optimize software of stand-alone devices with relatively short wakeup time compared to sleep-time.

A further object of the present disclosure is to enable code profiling on Low Energy devices with relatively short wakeup time compared to sleep-time.

A further object of the present disclosure is to have access to the code profiling results anytime.

A further object of the present disclosure is to perform code profiling without requiring a Trace Unit, other debug units, additional output pins, or an external PC using a debugger.

A further object of the present disclosure is to extend standby time of the device due to optimized wake-up time.

A further objective is to achieve a low-energy device enabled for code profiling at minimal cost.

Moreover an object of the present disclosure is to have an external memory available for global variable storage.

In accordance with the objects of this disclosure a method to perform code profiling for processing devices having a low duty cycle has been achieved. The method disclosed comprises the steps of: (1) providing a processing device, having one or more functions with a low duty cycle, comprising a timer, wherein an external memory is connected to the device, and wherein for each function one or more global variables are assigned, (2) starting code profiling, and (3) calling functions of the device by a main function, determine the duration each function was active and put the duration results into a first of the one or more related global variables, wherein, in case a function was called multiple times, the durations of each call are incremented in its global variable. Furthermore the method comprises the steps of: (4) writing at the end of the code profiling, after all function calls are done, the values of the one or more global variables to the memory, and (5) reading out the values from the memory.

In accordance with the objects of this disclosure a processing device to perform code profiling for functions having low duty cycle has been achieved. The processing device comprises: a timer, an external memory connected to the processing device, and a micro-controller configured to at least start the timer, calling, as required, the functions having low duty cycle, determining duration between start and end of each function, storing, if applicable added-up, duration values to global variables assigned to each function, stopping timer after all function calls are done, writing global variable values to the external memory, and going to sleep mode.

BRIEF DESCRIPTION OF THE DRAWINGS

In the accompanying drawings forming a material part of this description, there is shown.

DESCRIPTION OF THE PREFERRED EMBODIMENTS

The preferred embodiments of the present disclosure disclose how to perform code profiling on devices having a relatively short wake-up time compared to the sleep time (low duty cycle).

A preferred embodiment of the disclosure performs code profiling on an ultra-low energy (ULE) device. The disclosure can be applied to any other devices having low duty-cycle.

Figure 1:
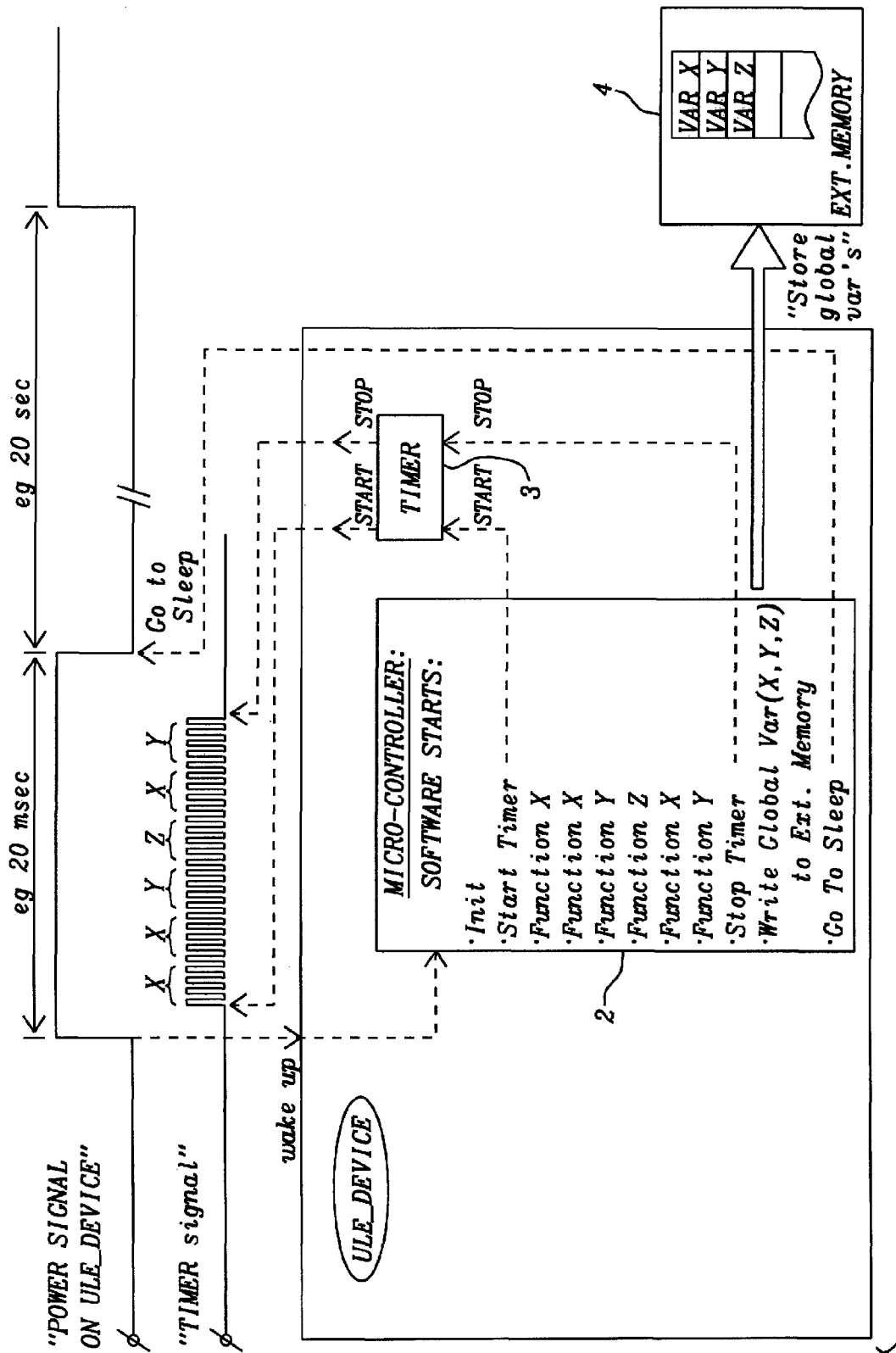
FIG. 1 shows a block diagram of an ULE device including its micro-controller, Timer, and an external memory.

The range of duty cycle, i.e. the ratio between wake-up time/sleep-time may be e.g. approximately $1/1000$. This means x mseconds wake-up time and x seconds sleep-time. The disclosure could be also advantageously be applied to other ratios FIG. 1 shows a block diagram of an ULE device 1 including its micro-controller 2, Timer 3, and an external memory 4.

The code profiling method disclosed uses an available timer 3 on the ULE device (this may be a system timer (Systick) or another on-chip timer). The value of global variables is stored in an (e.g. external) non-volatile memory 4 (e.g. EPROM) before the device 1 is going into sleep-mode.

It should be noted that timers are usually available on devices having software implemented for different functions.

Such a timer can be used for code profiling because during code profiling the value of the timer 3 is only read and its value is never changed.

Every function has its own identical global variable which represents how many Timer 3 ticks this function was active. Reading out the EPROM 4 at a later point of time shows the Code Profile of the ULE device during wakeup.

Only the Code profile during wake-up is interesting. During sleep mode nothing happens.

In the preferred embodiment each function call has an own identical global variable and two local variables. Alternatively the number of global variables may be higher as e.g. for counting the number a function is called or for a "time-stamp" noting when the function was called.

It should be noted that in software it is not allowed to have global variables with the same name. Therefore every global variable has its own definition (name).

|  | This means |
|---|---|
|  | global variable varX is for function X; |
|  | global variable varY for function Y; |
|  | global variable varZ for function Z |
| .. | etc. |
|  | and |
|  | Local variables for functionX are varX1, varX2, |
|  | Local variables for functionY are varY1, varY2, |
|  | Local variables for functionZ are varZ1, varZ2, |
| .. | etc. |

It should be noted that a global variable is known by the Software during all the wakeup time, a local variable is only valid (known by the software) in the function call it is declared in.

These Global variables all start with value 0 after the application wakes up. After wakeup the Timer is started and counts from 0 . . . (e.g. 24 bits) and then wraps around.

If function call X is executed for the first time, the actual timer value is stored in local variable 'varX1' at the start of this function. At the end of this function call X the actual timer value is stored in local variable 'varX2'. The Global variable 'varX' is incremented with the difference between 'varX2' and 'varX1' at the end of this function X. So this Global value 'varX' is now 0+(varX2−varX1).

Then for instance Function Y could be executed, it also has its own Global variable 'varY' and 2 local variables 'varY1' and 'varY2'. The actual timer value is stored in local variable "varY1' at the start of this function Y. At the end of this function Y the actual timer value is stored in local variable 'varY2'. The Global variable 'varY' is incremented with the difference between 'varY2' and 'varY1' at the end of this function Y. At the end of the function Y global variable varY=0+(varY2−varY1).

In case e.g. Function call X is called again, the local variables of function X varX1 and varX2 are getting the actual Timer values at the start or correspondingly the end of the function X as described earlier. The Global variable 'varX' is incremented with varX2−varX1 again at the end of functionX. So varX will be 'previous value+(varX2−varX1)', etc.

After all functions of the wake-up mode are called and the device is going into sleep-mode, all global functions variables are first stored in the external non-volatile memory 4 (e.g. Eprom).

It should be noted that the user (or application) determines which functions are called, so it is possible that in certain circumstances some functions are not used (called). In that case the global variable is 0

The user can read out this Eprom memory 4 for checking the Code Profiling at a later point of time, optimize the code and do Code Profiling again to check the improvements etc. The user can add more Global variables, e.g. in order to count the number every functions is called and/or to get a kind of a 'Timestamp' by measuring when the function was active. These Count and Timestamp global variables are also stored in Eprom then.

An example of the workflow of the software for code profiling is shown below:

---

Global var X = 0, Global var Y = 0, and Global var Z = 0;
Main Function is called;
.
.
.
Timer is started;
functions X, Y, Z etc. are called by main function, other functions, interrupt functions, or messages etc.
Then Timer is stopped;
.
.
Write all Global variables to Eprom memory;
Go to Sleep-mode;
.
.
.
Profiling Function X
Local var X1 = actual timer value (e.g. 23);
Functionality X has been performed;
Local var X2 = actual timer value (e.g. 158);
Global varX = its actual value + (varX2−varX1) or e.g. its actual value + (158−23):
.
.
.
Profiling Function Y
Local var Y1 = actual timer value;
Functionality Y has been performed;
Local var X2 = actual timer value;
Global var Y = its actual value + (varY2−varY1):
Global varX = its actual value + (varX2−varX1) or e.g. its actual value + (158−23):
..
.
Profiling Function Z
Local var Z1 = actual timer value;
Functionality Z has been performed;
Local var Z2 = actual timer value;
Global var Z = its actual value + (varZ2−varZ1):
Etc.

---

The main function is implemented in the ULE device. Every application has one main function and it is always called automatically a device wakes up. In case the code profile of the main function should be performed the same method as with the other functions can be used but the calculation of its global variable has to be done between the functions are called.

Figure 2:
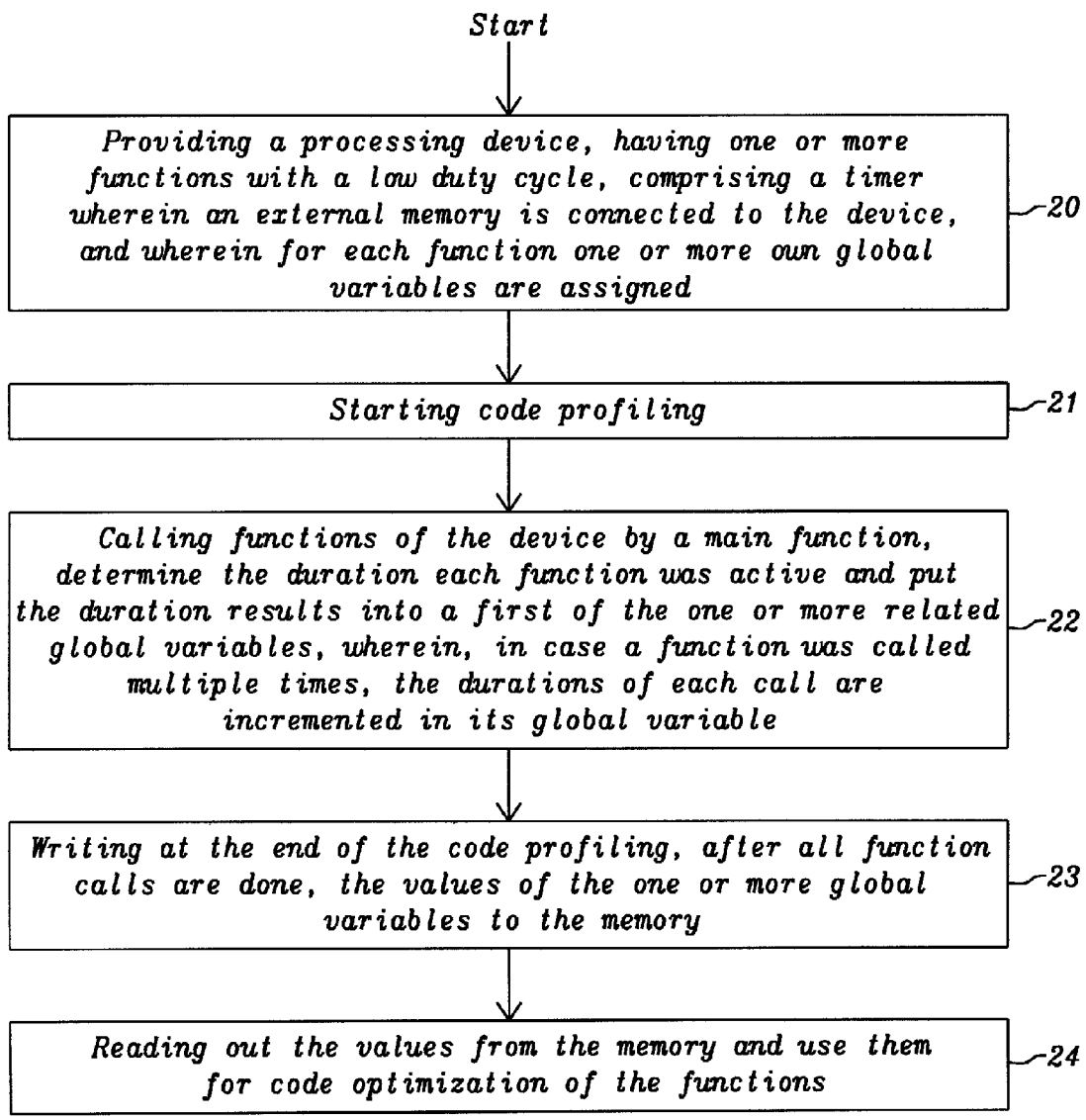
FIG. 2 illustrates a flowchart of a method to perform code profiling for processing devices having a low duty cycle.

FIG. 2 illustrates a flowchart of a method to perform code profiling for processing devices having a low duty cycle. A first step 20 describes the provision of a processing device, having one or more functions with a low duty cycle, comprising a timer, wherein an external memory is connected to the device, and wherein for each function one or more own global variables are assigned. Step 21 illustrates starting code profiling. Step 22 shows calling functions of the device by a main function, determine the duration each function was active and put the duration results into a first of the one or more related global variable, wherein, in case a function was called multiple times, the durations of each call are incremented in its global variable. Step 23 depicts writing at the end of the code profiling, after all function calls are done, the values the one or more global variables to the memory. Step 24 discloses reading out the values from the memory and used them for code optimization of the functions.

While the disclosure has been particularly shown and described with reference to the preferred embodiments thereof, it will be understood by those skilled in the art that various changes in form and details may be made without departing from the spirit and scope of the disclosure.

What is claimed is:

1. A computer-implemented method to perform code profiling for processing ultra-low energy (ULE) devices having a low duty cycle comprising the steps of
   (1) providing an ULE processing device, having one or more functions with a low duty cycle, comprising a timer, wherein an external memory is connected to the device, and wherein for each function one or more global variables are assigned;
   (2) starting code profiling including initialization and start of timer, wherein initialization and start of timer is performed in the ULE device only;
   (3) calling functions of the ULE device by a main function of the ULE device, determine the duration each function was active and put the duration results into a first of the one or more related global variables, wherein the one or more global variables are declared in a profiling code itself, and, in case a function was called multiple times, the durations of each call are incremented in its global variable;
   (4) writing by the ULE device at the end of the code profiling only, after all function calls are done, the values of the one or more global variables to the memory just before the ULE device is going to sleep mode; and
   (5) reading out the values from the memory.

2. The method of claim 1 wherein the results read out from the memory are used for code optimization.

3. The method of claim 1 wherein the external memory is a non-volatile memory.

4. The method of claim 3 wherein said non-volatile memory is an EEPROM.

5. The method of claim 1 wherein one of the one or more global variables is used to count the number every function is called.

6. The method of claim 1 wherein one of the one or more global variables is used to measure when a function was active.

7. The method of claim 1 wherein at least two local variables are used for each function, wherein a local variable is only valid in the function call it is declared in.

8. The method of claim 7 wherein a first of the at least two local variables of a function is used to store an actual timer value at the start of the function.

9. The method of claim 8 wherein a second of the local variables of a function is used to store an actual timer value at the end of the function.

10. The method of claim 7 wherein the values of two local variables are used to determine the duration a function was active and the result is added to a content of the related global variable.

11. The method of claim 1 wherein the functions can also be called by interrupt functions.

12. The method of claim 1 wherein the functions can also be called by messages.

13. The method of claim 1 wherein the functions can also be called by function calling means.

14. The method of claim 1 wherein only a part of the functions of the device are called, wherein a related global variable is set to zero.

15. The method of claim 1 wherein code profiling of the main function is performed wherein related global variables have be calculated between related functions are called.

16. The method of claim 1 wherein the low duty cycle is in an order of magnitude of about 1 wake-up time/1000 sleep-time.

17. The method of claim 1 wherein the processing device is an Ultra-Low Energy (ULE) device.

18. An ultra-low energy (ULE) processing device to perform code profiling for functions having low duty cycle comprising:
   a timer;
   an external memory connected to the processing device; and
   a micro-controller configured to at least perform initialization of the profiling, including initialization and start of the timer, wherein initialization and start of the timer is performed in the ULE processing device only, calling, as required, the functions having low duty cycle, determining duration between start and end of each function, storing, if applicable added-up, duration values to global variables assigned to each function, wherein the global variables are declared in a profiling code itself, stopping timer after all function calls are done, writing global variable values to the external memory only at the end of the code profiling, and going to sleep mode.

19. The device of claim 18 wherein results read out from the memory are used for code optimization.

20. The device of claim 18 wherein the external memory is a non-volatile memory.

21. The device of claim 20 wherein said non-volatile memory is an EEPROM.

22. The device of claim 18 wherein one of the one or more global variables is used to count the number every function is called.

23. The device of claim 18 wherein one of the one or more global variables is used to measure when a function was active.

24. The device of claim 18 wherein at least two local variables are used for each function, wherein a local variable is only valid in the function call it is declared in.

25. The device of claim 24 wherein a first of the at least two local variables of a function is used to store an actual timer value at the start of the function.

26. The device of claim 25 wherein a second of the local variables of a function is used to store an actual timer value at the end of the function.

27. The device of claim 26 wherein the values of two local variables are used to determine the duration a function was active and the result is added to a content of the related global variable.

28. The device of claim 18 wherein the functions can also be called by interrupt functions.

29. The device of claim 18 wherein the functions can also be called by messages.

30. The device of claim 18 wherein the functions can also be called by function calling means.

31. The device of claim 18 wherein only a part of the functions of the device are called, wherein a related global variable is set to zero.

32. The device of claim 18 wherein code profiling of the main function is performed wherein related global variables have be calculated between related functions are called.

33. The device of claim 18 wherein the low duty cycle is in an order of magnitude of about 1 wake-up time/1000 sleep-time.

34. The device of claim 18 wherein the processing device is an Ultra-Low Energy (ULE) device.

\* \* \* \* \*